United States Patent [19]
Gil Garcia

[11] Patent Number: 5,918,588
[45] Date of Patent: Jul. 6, 1999

[54] DEVICE FOR THE CLOSING AND AUTOMATIC OPENING OF THE COVER OF A COOKING INSTRUMENT, ESPECIALLY GRILLS, GRIDDLES AND THE LIKE

[76] Inventor: Vicente Gil Garcia, C. Comte de Borrell, 308, 08029 Barcelona, Spain

[21] Appl. No.: 08/790,085

[22] Filed: Jan. 29, 1997

[30]   Foreign Application Priority Data

Jan. 30, 1996  [ES]   Spain ................................. P 9600332

[51] Int. Cl.$^6$ ......................................................... A47J 37/00
[52] U.S. Cl. ..................... 126/41 R; 126/25 R; 126/197; 126/220
[58] Field of Search .............................. 126/41 R, 41 D, 126/41 E, 220, 197, 214 D, 192, 25 R; 431/139, 146, 152, 134; 99/349, 422, 423, 424, 351

[56]   References Cited

U.S. PATENT DOCUMENTS

| | | | |
|---|---|---|---|
| 4,364,308 | 12/1982 | John et al. | 99/351 |
| 4,444,094 | 4/1984 | Baker et al. | 99/423 |
| 4,852,545 | 8/1989 | Sherman et al. | 126/41 R |
| 5,293,020 | 3/1994 | Han et al. | 126/197 |
| 5,341,727 | 8/1994 | Dickson | 99/349 |
| 5,419,305 | 5/1995 | Hanley | 126/197 |
| 5,422,458 | 6/1995 | Simmel | 126/192 |

*Primary Examiner*—Ira S. Lazarus
*Assistant Examiner*—Josiah C. Cocks
*Attorney, Agent, or Firm*—Steinberg & Raskin, P.C.

[57]   ABSTRACT

Device for closing and automatically opening a cover of a cooking instrument, such as a grill and griddle, which includes a timing unit to determine the time for which the cooking instrument will function. The device includes an electromagnet for keeping the cover in closed and one or more springs for actuating opening of the cover, i.e., the springs are biased to open the cover. In operation, the closing position of the cover is detected, e.g., by a microswitch, and the electromagnet is activated in order to keep the cover closed. The electromagnet is controlled by the timing unit such that, when the cover is closed, the electromagnet is activated and the cover remains closed, and the electromagnet is deactivated after the time preset by the timing unit so that the cover is automatically opened through the bias of the springs.

20 Claims, 1 Drawing Sheet

DEVICE FOR THE CLOSING AND AUTOMATIC OPENING OF THE COVER OF A COOKING INSTRUMENT, ESPECIALLY GRILLS, GRIDDLES AND THE LIKE

FIELD OF THE INVENTION

The present invention relates to a device for the closing and automatic opening of the cover of a cooking instrument, especially grills, griddles and the like.

BACKGROUND OF THE INVENTION

Known in the art are devices for the closing and automatic opening of the cover of a cooking instrument, especially grills, griddles and the like, which include a timing unit to determine the time for which the cooking instrument will function, and means for keeping the cover closed.

With such devices, the closing and opening of the cover of the cooking instrument are implemented by a pneumatic system, with an air compressor unit, and all the accessories associated with said system. The utilization of pneumatic systems on said devices involves high costs due both to the time needed to construct same and the materials required for that construction.

Moreover, utilization of the pneumatic system means that more space is occupied by the device, so that the cooking instrument fitted with it also has that same disadvantage.

Moreover, the known devices include counterweights to implement the automatic opening of the cover when the means which keep the cover closed cease to act.

Said counterweights have the disadvantage that, when the closing means cease to act, they fall violently and involve a significant danger for users of the cooking instruments fitted with them.

OBJECTS AND SUMMARY OF THE INVENTION

The device of the invention manages to overcome said disadvantages, while providing further advantages to be described below.

The device for automatic opening of the cover of a cooking instrument, especially grills, griddles and the like, is characterized in that it includes means for detecting the position of the cover, which detecting means detect the closed position and permit actuation of the means which keep the cover closed, with the timer unit deactivating the closing means in such a way that, when the cover is closed, it remains closed due to the action of the means which keep the cover closed, the cover opening after the time preset by the timing unit through the action of the cover opening actuating means, which act when the means keeping the cover closed are deactivated.

The opening of the cover and the time it remains closed are automatically controlled thereby, which is very important for certain cooking instruments, since exposure of the foods to a preset temperature over a period longer than necessary can lead to their deterioration.

Preferably, the means which keep the cover closed consist in an electromagnet.

Utilization of an electromagnet provides control over the time the cover remains in the closed position, supply or non-supply of current being based on the action of the timing units with which the kitchen instruments are fitted. Following the present time, said timing units cut off electrical current to the electromagnet, thereby achieving automatic opening of the cover through the action of the cover opening actuating means.

Preferably, the means for detecting the position of the cover consist in a microswitch.

When closing of the cover is implemented, part of the cover presses upon the microswitch, thereby detecting closing of the cover.

According to one characteristic of the invention, the means for actuating opening of the cover are gas-operated springs.

Said gas-operated springs tend to keep the cover permanently open. Thus, when the timing unit deactivates the means which keep the cover closed, the cover opens automatically.

Advantageously, the means which activate opening of the cover are articulated, at one of their ends, onto the casing of the cooking instrument, while the other end is articulated onto the cover.

BRIEF DESCRIPTION OF THE DRAWINGS

For a better understanding of all that has been set out some drawings are attached in which, schematically and solely by way of non-restrictive example, a practical case of embodiment is shown.

In the drawings.

DETAILED DESCRIPTION OF THE PREFERRED EMBODIMENTS

Figure 1:
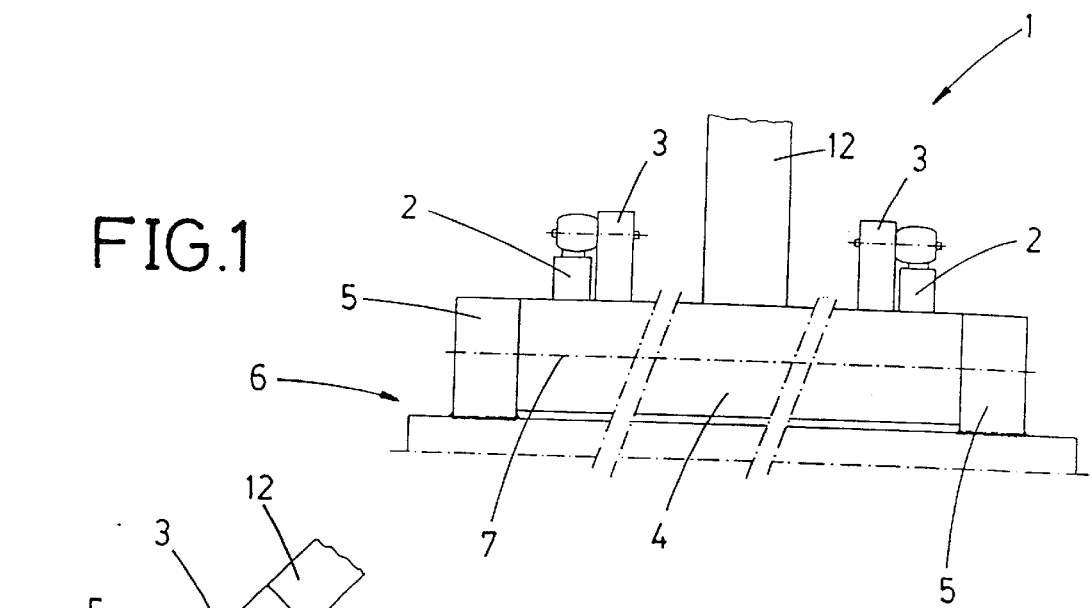
FIG. 1 is a partial elevation view of the rear part of the device for closing and automatic opening of the cover of a cooking instrument, object of the invention.

As can be seen in FIG. 1, the device 1 for closing and automatically opening of the cover of a cooking instrument, especially grills, griddles and the like, includes a pair of gas-operated springs 2 for the purpose of keeping the cover of the cooking instrument in the open position at all times. Said gas-operated springs 2 are articulated, by their upper ends, to some fins 3 which emerge from a piece 4 articulated, at each of its ends, onto some supports 5 fitted onto the casing 6 of the cooking instrument. Said articulated piece 4 rotates around a spindle 7, thereby opening or closing the cover.

Figure 3:
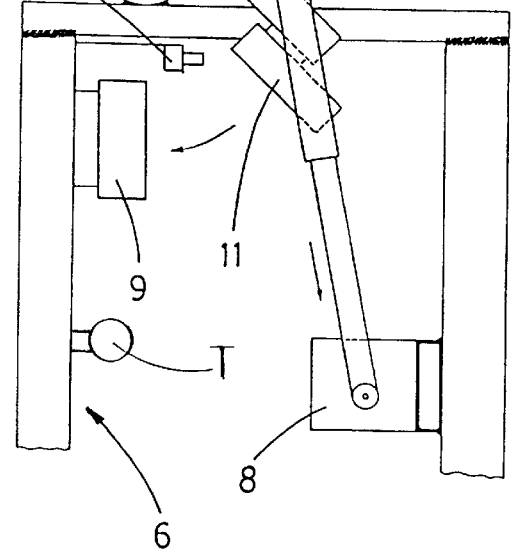
FIG. 3 is a side elevation view of the device with the cover of the cooking instrument closed.
Figure 2:
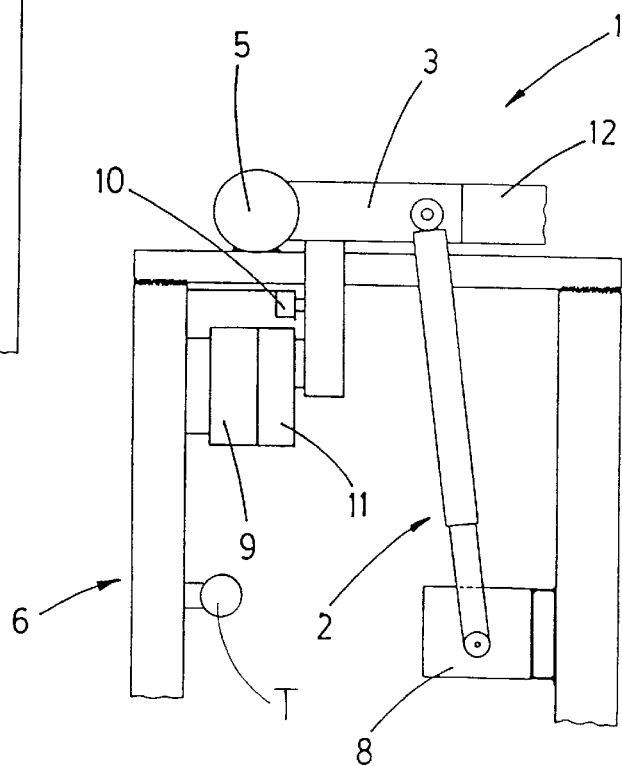
FIG. 2 is a side elevation view of the device with the cover of the cooking instrument open.

The gas-operated springs 2 are also articulated by their lower ends to some fins 8 which emerge from the casing 6 of the cooking instrument (FIGS. 2 and 3).

As can be seen in FIGS. 2 and 3, the device 1 object of the invention also includes an electromagnet 9 for the purpose of keeping the cover closed, a microswitch 10 which detects this closure and allows the electromagnet 9 to come into operation, a metal bar 11 attached to a piece 12 which actuates the cover, which interacts with the electromagnet 9 when the cover has been closed, and a timing unit T which counts the time during which the cover must remain in said position.

The device 1 therefore operates as follows.

Starting with the cover of the cooking instrument in open position, the user of the instrument closes the cover, which closure is detected by the microswitch 10. Said microswitch 10 permits the passage of electric current through the electromagnet 9, so that when the metal bar 11 which is attached to the cover actuating piece 12 comes into contact with the electromagnet 9 the cover is fixed in the closed position. At the same time, the user must act upon the timing unit T to set the time during which the cover must remain in the open position.

Once the programmed time has elapsed the timing unit cuts off the supply of current to the electromagnet, so that said electromagnet 9 ceases to act and the gas-operated springs 2 cause automatic opening of the cover of the cooking instrument.

Despite the fact that reference has been made to specific embodiments of the invention, it is obvious to an expert in the subject that the device described can incorporate many variations and modifications, and that all the details mentioned can be replaced by other technically equivalent details without thereby departing from the sphere of protection defined by the attached claims.

I claim:

1. A cooking instrument, comprising a cover, a device for closing and automatically opening said cover, said device comprising an electromagnet having an activated condition in which said cover is kept closed and a deactivated condition when said cover is openable, detecting means for detecting when said cover is closed and permitting activation of said electromagnet when the cover is closed in order to keep said cover closed, and at least one spring biased to open said cover; and a timing unit arranged to determent the time for which the cooking instrument will function, said timing unit also being arranged to control said electromagnet such that, when said cover is closed, said electromagnet is activated and said cover remains closed, and said electromagnet is deactivated after the time preset by said timing unit such that said cover is automatically opened through the bias of said at least one spring.

2. The cooking instrument as claimed in claim 1, wherein said detecting means comprise a microswitch.

3. The cooking instrument as claimed in claim 1, wherein said at least one spring is gas-operated.

4. The cooking instrument as claimed in claim 1, wherein said at least one spring comprises a plurality of springs.

5. The cooking instrument as claimed in claim 1, wherein said cover includes a metal bar, said electromagnet being positioned relative to said cover such that said metal bar of said cover comes into contact with said electromagnet when said cover is closed.

6. The cooking instrument as claimed in claim 1, further comprising a casing, said electromagnet being arranged on said casing.

7. The cooking instrument as claimed in claim 1, further comprising a casing, said timing unit being arranged on said casing.

8. The cooking instrument as claimed in claim 1, further comprising a casing, said at least one spring being articulated at one end to said casing and at an opposite end to said cover.

9. Device for closing and automatic opening a cover of a cooking instrument which includes a timing unit to determine the time for which the cooking instrument will function, comprising an electromagnet for keeping the cover closed, said electromagnet having an activated condition in which the cover is kept closed and a deactivated condition when the cover is openable, means for detecting the position of the cover, and at least one spring for actuation opening of the cover, said at least one spring being biased to open the cover, said detecting means detecting the closing position of the cover and permitting activation of said electromagnet in order to keep the cover closed, said electromagnet being controlled by the timing unit such that, when the cover is closed, it remains closed due to the action of said electromagnet and the cover opens after the time preset by the timing unit through the action of said at least one spring and the deactivation of said electromagnet.

10. Device as claimed in claim 9, wherein said means for detecting the position of the cover is a microswitch.

11. Device as claimed in claim 9, wherein said at least one spring is articulated, by one of its ends, into a casing of the cooking instrument, while the other ends is articulated onto the cover.

12. Device as claimed in claim 9, wherein the cooking instrument is a grill.

13. Device as claimed in claim 9, wherein the cooking instrument is a griddle.

14. Device as claimed in claim 9, wherein said at least one spring is gas-operated.

15. Device as claimed in claim 9, wherein said at least one spring comprises a plurality of springs.

16. Device as claimed in claim 9, wherein the cover includes a metal bar, said electromagnet being positioned relative to the cover such that the metal bar of the cover comes into contact with said electromagnet when the cover is closed.

17. Device as claimed in claim 10, wherein said microswitch is arranged to permit passage of electric current to said electromagnet when the cover has been closed.

18. Device as claimed in claim 11, wherein said electromagnet is arranged on the casing of the cooking instrument.

19. Device as claimed in claim 11, wherein the timing unit is arranged on the casing of the cooking instrument.

20. Device as claimed in claim 11, wherein said detecting means comprise a microswitch arranged on the casing of the cooking instrument.

* * * * *